Sept. 20, 1966  R. E. STOBBE ETAL  3,273,413
TRANSMISSION WITH AUTOMATIC MESHING CONTROL
Filed Aug. 28, 1963  7 Sheets-Sheet 1

INVENTORS.
RICHARD E. STOBBE, &
FRANK ZANKL
BY
Cyril M. Hajewski
ATTORNEY

Sept. 20, 1966          R. E. STOBBE ETAL          3,273,413
            TRANSMISSION WITH AUTOMATIC MESHING CONTROL
Filed Aug. 28, 1963                              7 Sheets-Sheet 4

INVENTORS.
RICHARD E. STOBBE, &
FRANK ZANKL
BY
Cyril M. Hajewski
ATTORNEY

Sept. 20, 1966     R. E. STOBBE ETAL     3,273,413
TRANSMISSION WITH AUTOMATIC MESHING CONTROL
Filed Aug. 28, 1963     7 Sheets-Sheet 5

| SPINDLE RPM | SHIFTER ROD ACTUATED BY LARGE PISTON INDICATED BY X — SHIFTER ROD | | | | MOTOR SPEED | | SHIFTER SOLENOID ENERGIZED INDICATED BY X — SHIFTER SOLENOID | | | |
|---|---|---|---|---|---|---|---|---|---|---|
| | A | B | C | D | 1200 RPM | 1800 RPM | AC | BC | CC | DC |
| 100 |   |   | X |   | X |   |   |   | X |   |
| 111 |   |   |   |   | X |   |   |   |   |   |
| 125 | X |   | X |   | X |   | X |   | X |   |
| 138 | X |   |   |   | X |   | X |   |   |   |
| 153 |   |   | X |   |   | X |   |   | X |   |
| 169 |   |   |   |   |   | X |   |   |   |   |
| 190 | X |   | X |   |   | X | X |   | X |   |
| 210 | X |   |   |   |   | X | X |   |   |   |
| 253 |   | X | X |   | X |   |   | X | X |   |
| 279 |   | X |   |   | X |   |   | X |   |   |
| 315 | X | X | X |   | X |   | X | X | X |   |
| 347 | X | X |   |   | X |   | X | X |   |   |
| 385 |   | X | X |   |   | X |   | X | X |   |
| 423 |   | X |   |   |   | X |   | X |   |   |
| 478 | X | X | X |   |   | X | X | X | X |   |
| 528 | X | X |   |   |   | X | X | X |   |   |
| 564 |   |   | X | X | X |   |   |   | X | X |
| 620 |   |   |   | X | X |   |   |   |   | X |
| 700 | X |   | X | X | X |   | X |   | X | X |
| 772 | X |   |   | X | X |   | X |   |   | X |
| 857 |   |   | X | X |   | X |   |   | X | X |
| 944 |   |   |   | X |   | X |   |   |   | X |
| 1064 | X |   | X | X |   | X | X |   | X | X |
| 1178 | X |   |   | X |   | X | X |   |   | X |
| 1420 |   | X | X | X | X |   |   | X | X | X |
| 1562 |   | X |   | X | X |   |   | X |   | X |
| 1764 | X | X | X | X | X |   | X | X | X | X |
| 1942 | X | X |   | X | X |   | X | X |   | X |
| 2160 |   | X | X | X |   | X |   | X | X | X |
| 2378 |   | X |   | X |   | X |   | X |   | X |
| 2682 | X | X | X | X |   | X | X | X | X | X |
| 2970 | X | X |   | X |   | X | X | X |   | X |

Fig. 8

INVENTORS.
RICHARD E. STOBBE, &
FRANK ZANKL
BY Cyril M. Hajewski
ATTORNEY

INVENTORS
RICHARD E. STOBBE &
FRANK ZANKL

BY Cyril M. Hajewski
ATTORNEY

| BINARY CODE | |
|---|---|
| SHIFTER ROD C NOT ACTUATED = | 1 |
| SHIFTER ROD A ACTUATED = | 2 |
| MOTOR 5 OPERATING AT 1800 R.P.M = | 4 |
| SHIFTER ROD B ACTUATED = | 8 |
| SHIFTER ROD D ACTUATED = | 16 |

| BINARY CHART |||||||||
|---|---|---|---|---|---|---|---|
| SPEED NO | SPINDLE R.P.M. | BINARY NO. | C | A | 1800 R.P.M. | B | D |
| 1 | 100 | 0 | 0 | 0 | 0 | 0 | 0 |
| 2 | 111 | 1 | 1 | 0 | 0 | 0 | 0 |
| 3 | 125 | 2 | 0 | 2 | 0 | 0 | 0 |
| 4 | 138 | 3 | 1 | 2 | 0 | 0 | 0 |
| 5 | 153 | 4 | 0 | 0 | 4 | 0 | 0 |
| 6 | 169 | 5 | 1 | 0 | 4 | 0 | 0 |
| 7 | 190 | 6 | 0 | 2 | 4 | 0 | 0 |
| 8 | 210 | 7 | 1 | 2 | 4 | 0 | 0 |
| 9 | 253 | 8 | 0 | 0 | 0 | 8 | 0 |
| 10 | 279 | 9 | 1 | 0 | 0 | 8 | 0 |
| 11 | 315 | 10 | 0 | 2 | 0 | 8 | 0 |
| 12 | 347 | 11 | 1 | 2 | 0 | 8 | 0 |
| 13 | 385 | 12 | 0 | 0 | 4 | 8 | 0 |
| 14 | 423 | 13 | 1 | 0 | 4 | 8 | 0 |
| 15 | 478 | 14 | 0 | 2 | 4 | 8 | 0 |
| 16 | 528 | 15 | 1 | 2 | 4 | 8 | 0 |
| 17 | 564 | 16 | 0 | 0 | 0 | 0 | 16 |
| 18 | 620 | 17 | 1 | 0 | 0 | 0 | 16 |
| 19 | 700 | 18 | 0 | 2 | 0 | 0 | 16 |
| 20 | 772 | 19 | 1 | 2 | 0 | 0 | 16 |
| 21 | 857 | 20 | 0 | 0 | 4 | 0 | 16 |
| 22 | 944 | 21 | 1 | 0 | 4 | 0 | 16 |
| 23 | 1064 | 22 | 0 | 2 | 4 | 0 | 16 |
| 24 | 1178 | 23 | 1 | 2 | 4 | 0 | 16 |
| 25 | 1420 | 24 | 0 | 0 | 0 | 8 | 16 |
| 26 | 1562 | 25 | 1 | 0 | 0 | 8 | 16 |
| 27 | 1764 | 26 | 0 | 2 | 0 | 8 | 16 |
| 28 | 1942 | 27 | 1 | 2 | 0 | 8 | 16 |
| 29 | 2160 | 28 | 0 | 0 | 4 | 8 | 16 |
| 30 | 2378 | 29 | 1 | 0 | 4 | 8 | 16 |
| 31 | 2682 | 30 | 0 | 2 | 4 | 8 | 16 |
| 32 | 2970 | 31 | 1 | 2 | 4 | 8 | 16 |

*Fig. 11*

INVENTORS.
RICHARD E. STOBBE, &
FRANK ZANKL
BY Cyril M. Hajewski
ATTORNEY

United States Patent Office 3,273,413
Patented Sept. 20, 1966

3,273,413
TRANSMISSION WITH AUTOMATIC MESHING CONTROL
Richard E. Stobbe and Frank Zankl, Milwaukee, Wis., assignors to Kearney & Trecker Corporation, West Allis, Wis., a corporation of Wisconsin
Filed Aug. 28, 1963, Ser. No. 305,095
20 Claims. (Cl. 74—346)

The present invention relates generally to an improved transmission and more particularly to a transmission especially adapted for driving the spindle of a machine tool.

The transmission, although particularly designed for a machine tool and applicable for driving the spindle thereof, is equally applicable for driving other elements that are to be driven at variable speeds.

An important object of the invention is to provide a smoothly operating transmission that will furnish a series of successive speeds arranged in geometric progression.

Another object of the invention is to furnish a successive geometric progression of speeds by the alternate use of two speeds of a two speed motor in cooperation with shiftable gear clusters.

A further object of the invention is to construct a variable speed transmission that will furnish a successive progression of speeds arranged in geometric progression by using a two speed input to the transmission properly coordinated with the shifting of the transmission to its different speeds.

Another object of the invention is to provide means to detect when any of the gear clusters, upon being shifted, fail to mesh, due to misalignment of the gear teeth.

It is also an object of the invention to provide means to substitute a creep drive to the transmission to correct the misalignment of the stuck gears and ensure proper meshing.

Still other objects and advantages of this invention will become apparent from the following detailed description of the exemplifying apparatus in connection with the accompanying drawings, in which.

Figure 1:
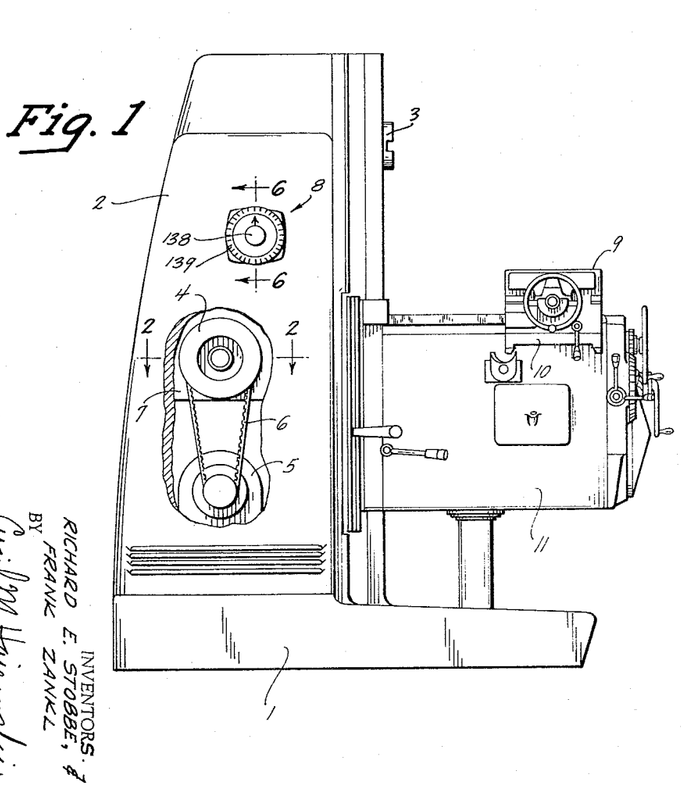
FIGURE 1 is a side elevation, illustrating a machine tool which may incorporate the present invention.

FIG. 1 illustrates a machine tool which may incorporate the present invention. The machine tool includes a base 1, vertical column 2, which carries a spindle 3, and houses a motor 5, belt 6, pulley 4 and the transmission 7 that is driven by the pulley 4 for rotating the spindle 3. The motor 5 is a two speed motor and can drive the transmission 7 at either of two speeds, either of which speeds are further modified by the transmission under the manipulation of a controller 8 to drive the spindle 3 at the desired speed for machining a workpiece. The workpiece is carried on a horizontally adjustable work slide 9 carried by a horizontally adjustable saddle 10 which, in turn, is mounted on a vertically adjustable knee 11.

Figure 2:
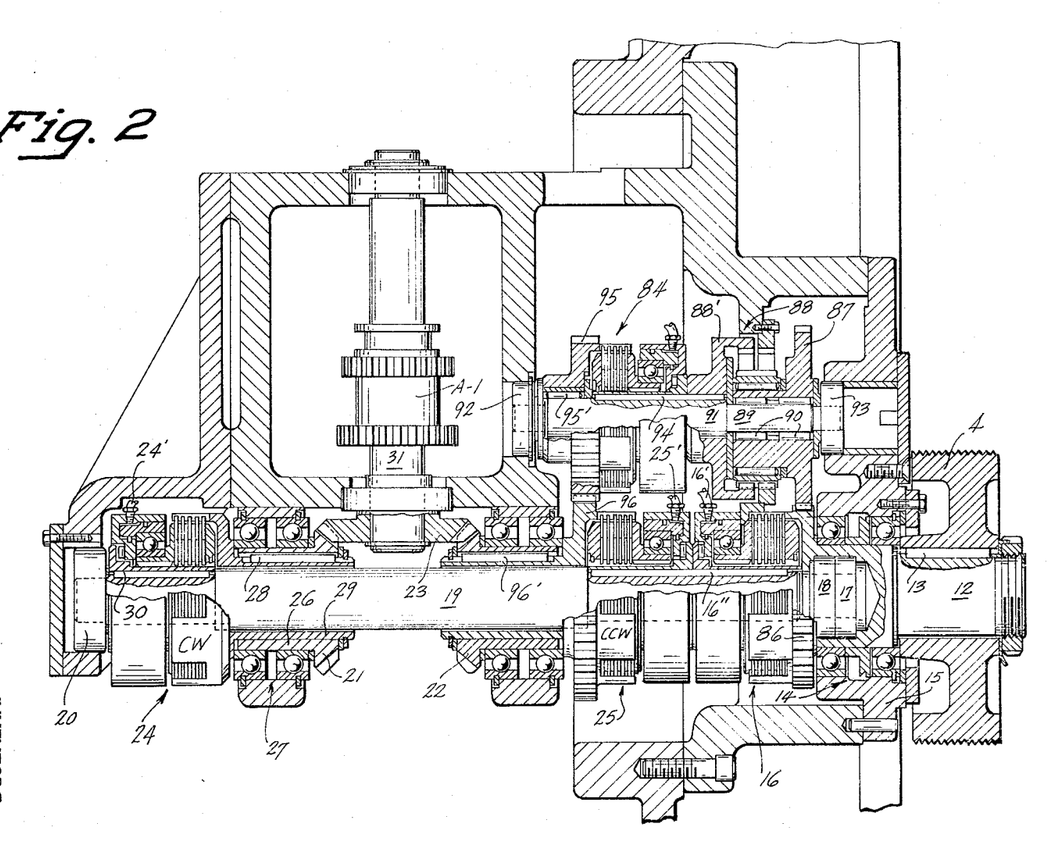
FIG. 2 is a horizontal section taken along the plane represented by the line 2—2 of FIG. 1, and illustrates the main drive control that extends from the pulley 4 to the first shaft 31 of the transmission.

The transmission is specially constructed and controlled to provide for selection among a series of speeds, here illustrated as thirty-two speeds, the speeds being in geometric progression from the lowest speed to the highest speed. Power input is transmitted to the transmission from the motor 5 by the belt 6, and transmission pulley 4. As illustrated in FIG. 2, the pulley 4 is mounted on an input shaft 12 and is fixed to rotate therewith by key 13. The input shaft 12 is mounted for rotation in bearings 14 housed in a frame 15 and extends to a transmission drive clutch 16. The inward end of the input shaft 12 is provided with an axial bore to receive a pair of bearings 17 and 18 that support one end of a main shaft 19, the other end thereof being supported by bearing 20. The main shaft 19 is supported so that it will not be influenced by the continuous rotation of the input shaft 12, but may be connected thereto by the transmission drive clutch 16. The driving part of the clutch 16 being driven by the input shaft 12 and the driven part of the clutch is keyed at 16", to drive the main shaft 19. Mounted for rotation independently of the main shaft 19 are two sleeved bevel gears 21 and 22 that mesh with a bevel gear 23 which is keyed to drive a first shaft 31 of the transmission 7, the bevel gear 21 being arranged to drive the shaft 31 in a clockwise direction while the bevel gear 22 drives the shaft 31 in a counterclockwise direction under the selective control of a clockwise clutch 24, and a counterclockwise clutch 25. In order to conveniently distinguish the clutches in FIG. 2, the clockwise clutch 24 is identified by the letters CW, while the counterclockwise clutch is identified by the letters CCW.

A sleeve 26 of bevel gear 21 is mounted for rotation in frame bearings 27 and is fixed to rotate with a sleeve extension 29 of the clutch 24 by a key 28. The driving part of clutch 24 is secured by a key 30 to rotate with the main drive shaft 19. The construction and operation of the counterclockwise bevel gear 22, clutch 25 and main drive shaft 19 is the same and need not be further described. Therefore power may be applied to the main drive shaft 19 by the actuation of the main drive clutch 16 and from there transmitted from the main drive shaft 19 to the first transmission shaft 31 in either clockwise rotation by actuation of clutch 24 or in counterclockwise direction by actuation of clutch 25. The clutches are fluid operated and, for this purpose, have fluid conduits 16', 25', and 24'.

Figure 3:
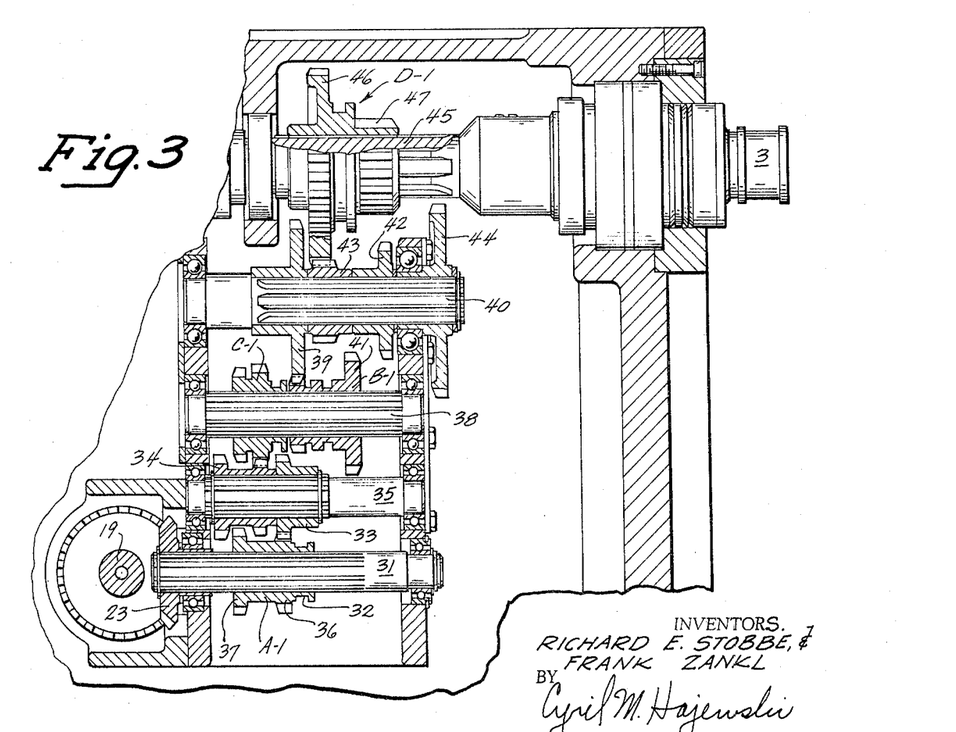
FIG. 3 is a fragmentary vertical section through the machine tool parallel to the shaft 31 of FIG. 2, and illustrates the transmission and its drive to spindle 3.

The transmission is illustrated in FIG. 3, which, as aforesaid, can be driven in clockwise or counterclockwise direction by bevel gear 23 which drives the first transmission shaft 31. Shaft 31 is splined to accommodate the shifting movement of a first gear cluster A–1, which has the usual annular groove 32 for receiving its shifting fork. Gear cluster A–1 is adapted to mesh with either gear 33 or gear pair 34, both of which are non-slidably keyed to shaft 35. Gear 36 of the gear cluster A–1 is shown meshing with gear 33, but it may be shifted so that its gear 37 may mesh with the lefthand gear of gear pair 34. Splined shaft 38 slidably supports two shiftable gear clusters B–1 and C–1. Gear cluster C–1 can be selectively driven by either of the gears of gear pair 34, being shown meshing with the righthand gear of the pair to drive the shaft 38. Gear cluster B–1 is likewise driven by shaft 38 and is shown meshing with a driving gear 39 for rotating a shaft 40 which is spline connected thereto. Gear cluster B–1 may be shifted so that its gear 41 meshes with gear 42 to drive shaft 40 at a different speed. Two gears 43 and 44 are fixed to rotate with shaft 40 and they selectively carry the drive to a spindle shaft 45 as determined by the position of a shiftable gear cluster D–1 which has a large gear 46 adapted to mesh with small gear 43 and which can be shifted to mesh a small gear 47 with large gear 44. Spindle shaft 45 drives the spindle 3 in its machining operations. Transmission shafts 31, 35, 38 and 40 and spindle shaft 45 are all rotatably mounted in suitable bearings as is apparent. Shafts 31, 38 and 45 have shiftable gear clusters, whereas the clusters on shafts 35 and 40 are non-slidable with respect to their shafts.

In the instant disclosure, there are four shiftable gear clusters A–1, B–1, C–1 and D–1, each having one shifted position to individually impose a particular gearing ratio on the transmission drive and shiftable to another position to impose a different gearing ratio. The gear clusters, in the instant detailed embodiment of the invention, each produce different spindle speeds in a geometric progression. The gear clusters may therefore be individually shifted or shifted in various combinations selectively to obtain the desired spindle speeds in the geometric progression.

Figure 4:
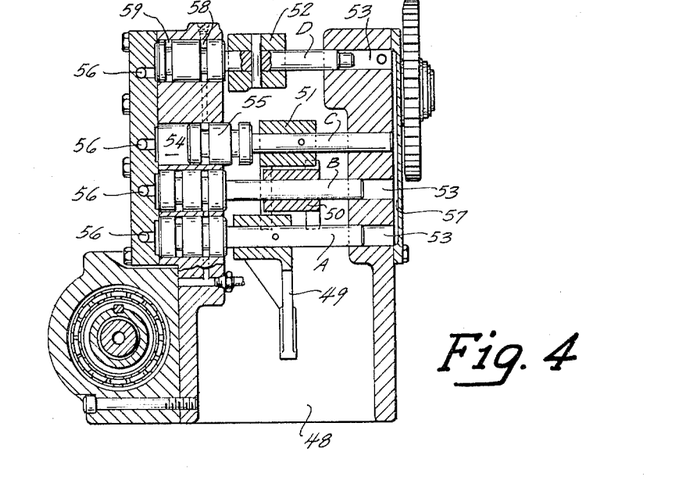
FIG. 4 is a vertical section through a portion of the machine of FIG. 1 to show the hydraulic motors for actuating the forks that shift the gear clusters.
Figure 5:
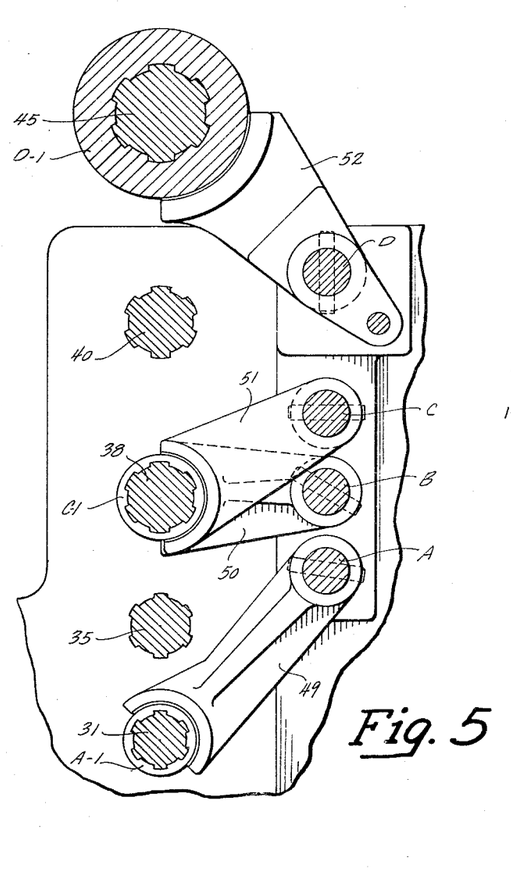
FIG. 5 is a view partly in elevation and partly in vertical section taken at right angles to the transmission shafts to illustrate the shifting forks and their relation to the fork operators and the transmission gear clusters.

Each of the gear clusters has an annular fork engaging groove such as groove 32 of cluster A–1, previously mentioned, and shifting forks 49, 50, 51 and 52 are shown mounted on shift rods A, B, C and D in FIGS. 4 and 5, the shift rods corresponding to the gear clusters A–1, B–1, C–1 and D–1 respectively as shown in FIG. 5. Each of the shift rods is mounted for slidable movement in bores of the frame 48 from a position to the left, as shown by shift rod A in FIG. 4, to a position at the right, as shown by shift rod C. The righthand bores 53 constitute cylinders that support the right end of the shift rods and the left bores 54 constitute cylinders receiving pistons 55 formed on the left ends of the shift rods. The pistons not only support the left ends of the shift rods but also constitute part of a piston and cylinder fluid motor that actuates the shift rods. To this end, each of the cylinders 54 has an individual fluid inlet 56 for conducting fluid to the cylinders selectively for forcing the pistons and thereby the shift rods to their right position. Each of the right bores or cylinders 53 receives continuously applied pressure fluid from a common conduit 57, which pressure acts on the ends of the shift rods for continuously urging the shift rods to the left position. Accordingly, this is the normal position of the shift rods. Any one of the shift rods or any combination of them can be moved to the right position by selectively conducting pressure fluid to the conduits 56 and into the cylinders 54. Due to the larger area of the pistons 55, pressure fluid applied to any of the cylinders 54 will overcome the pressure in the respective cylinder 53 to move the associated shifter rod to the right, and upon the release of pressure in the cylinders 54, the pressure in cylinders 53 will take over to force its shift rod to its normal left position. It is noted, for later reference, that each of the pistons 55 has two annular grooves 58 and 59.

The relative positions of the respective shift rods A, B, C and D, the shift forks 49, 50, 51 and 52, the corresponding shiftable gear clusters A–1, B–1, C–1 and D–1, and the transmission shafts 31, 35, 38, 40 and 45 are depicted in FIG. 5. As illustrated, actuating the shift rod A longitudinally will shift the fork 49 and slide the gear cluster A–1 along its shaft 31. The other shafts, forks and gear clusters will operate in the same manner.

Figure 9:
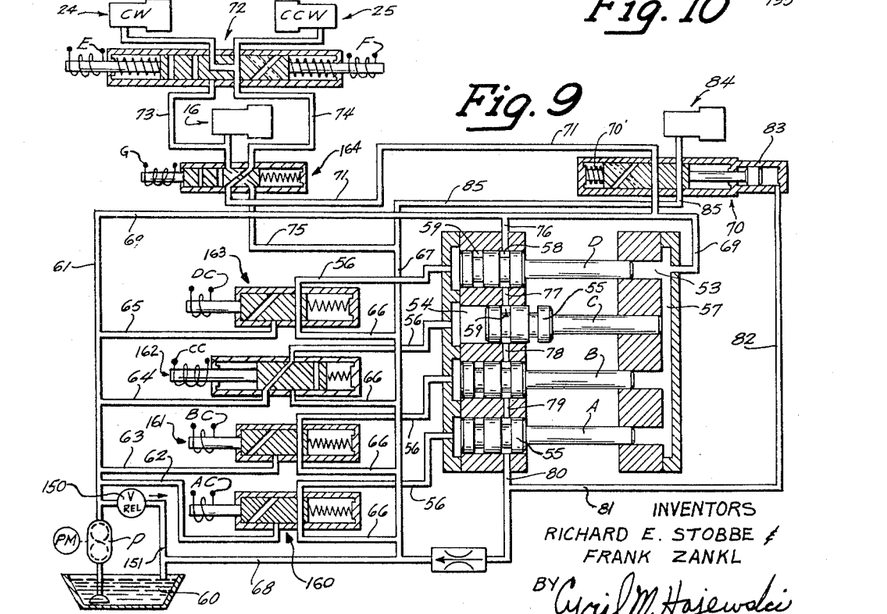
FIG. 9 is a diagrammatic view of the hydraulic circuit incorporated in the machine.

The fluid system for operating the shift rods A, B, C and D and also the clutches 16, 24 and 25, is shown in FIG. 9. Fluid from the reservoir 60 is withdrawn therefrom by the pump P and forced through the pressure conduit 61. A relief valve 150 is connected in a conduit 151 that branches from the pressure line 61 and discharges into the reservoir 60. The relief valve 150 functions in well known manner to maintain a uniform pressure in the hydraulic circuit illustrated in FIG. 9. The hydraulic pressure from the conduit 61 flows into branch conduits 62, 63, 64 and 65 to the solenoid valves 160, 161, 162 and 163 for control of the fluid to the conduits 56 which supply fluid to the cylinders 54 for selective activation of the shift rods A, B, C and D. The plungers of the solenoid valves are urged into their normal positions by a spring located within each of the valve bodies and acting against the plunger to urge it to the left, as viewed in FIG. 9. Solenoid valve 163 is shown deactivated with its cross passage connecting conduit 56 to an exhaust line 66 which, in turn, is connected to a common return line 67 thereby draining any fluid in its associated cylinder 54 to the reservoir 60 via a connected general return line 68. As a result, the shift rod D is in its normal left position under the urge of pressure fluid in its cylinder 53, received from the common pressure conduit 57, the fluid therein being under constant pressure from the pressure line 61 and a connecting branch line 69.

Solenoid valve 162 is illustrated as being activated and its diagonal passage connects the branch line 64 from the pressure line 61 to its line 56 and thence to the cylinder 54 of shifter rod C for moving shifter rod C to its right position as shown. The pressure in the cylinder 54, due to the larger area of the piston 55, overcomes the urging pressure in common conduit 57. In a similar manner, any one or any desired combinations of the solenoid valves 160, 161, 162 and 163 can be activated to actuate the corresponding shifter rods A, B, C and D.

Pressure fluid along branch conduit 69 passes through a control valve 70, as shown, into conduit 71 and from thence through an energized solenoid valve 164 to the transmission drive clutch 16 and also to either one of the directional drive clutches 24 and 25 as determined by the setting of a valve 72 operated by solenoids E and F. The plunger of the valve 72 has three positions and is centered to its neutral position by a pair of springs contained within the valve with one spring being located on each side of the plunger. The solenoids E and F may be energized selectively for shifting the valve plunger of the valve 72 from its neutral position against the force of the centering springs to selectively actuate the directional clutches 24 and 25. Thus, energization of the solenoid E functions to shift the valve plunger to the left as viewed in FIG. 9, while energization of the solenoid F operates to shift the valve plunger in the opposite direction.

Each of the clutches mentioned herein are fluid operated. Conduction of fluid through the solenoid valve 164 to the transmission drive clutch 16 actuates the drive clutch 16 for rotating the main drive shaft 19. Connection of the main drive shaft to the transmission for rotating the spindle in either a clockwise or a counterclockwise direction is determined by the directional clutches 24 and 25 as controlled by the solenoids F and E respectively. In FIG. 9, the solenoid valve 72 is shown in neutral position. If solenoid F is energized, the plunger of the directional valve 72 would be in its right position to conduct fluid from a branch line 73 to the clutch 24, the fluid from the branch line 73, receiving fluid through the valve G as it passes to the transmission drive clutch 16. In this setting of valve 72, as shifted by energized solenoid F, the counterclockwise clutch 25 is connected to exhaust, through valve 72, a conduit 74, through energized valve 164, to a conduit 75 and thence through conduits 67 and 68 to the reservoir 60. The neutral setting of valve 72 places its middle passages in position to connect both clutches 24 and 25 to branch line 74 as shown in FIG. 9 and this renders the transmission inactive. Activation of the solenoid E moves the plunger of the valve 72 to its left position to place its cross passages in active relation and it is apparent that clutch 25 is then connected to the pressure line 73 and clutch 24 to the exhaust line 74.

Creep clutch

Another feature of the present invention is to facilitate the shifting of the gear clusters by insuring the proper meshing of the gears as they are shifted. Immediately prior to effecting a gear shift, the solenoids E, F and G are deenergized. As a result, the plunger of the valve 72 is centered as shown in FIG. 9, while the plunger of the solenoid valve 164 shifts to the position depicted in FIG. 9 inasmuch as the plunger of this valve is illustrated in its neutral position with the solenoid G deenergized. The flow of hydraulic pressure to the transmission drive clutch 16 is therefore interrupted and the clutch is connected to exhaust by one of the cross passages in the plunger of valve 164 and the conduits 75, 67 and 68. On the other hand, the deactuation of the valve 164 causes the other cross passage in its plunger to be positioned for directing the hydraulic pressure from the line 71 to the conduit 74 which carries it to the valve 72. Since the latter is in its neutral position as illustrated in FIG. 9, the pressure flows through the valve to both directional clutches 24 and 25 to actuate them. Such simultaneous actuation of the clutches 24 and 25 operates as a brake for stopping the rotation of the spindle 3 and its associated drive.

As any one of the gears that may be shifted moves sidewise into mesh with its companion gear, the shifting movement may be halted if the teeth of the shifting gear and its companion gear are out of meshing alignment since the side of the teeth of one will abut the side of the teeth of the other and stall the shifting operation. This condition can be readily alleviated by effecting relative movement of the gears to relieve the restriction and enable them to move into meshing engagement. Therefore provision is provided to create such relative movement under the influence of a control which detects the failure of complete shifting. As above noted, each of the pistons 55 of shift rods A, B, C and D have spaced annular grooves 58 and 59, as shown in FIG. 9. Pressure line 69 has a branch line 76 that conducts pressure fluid to the side of the cylinder 54 of shift rod D, and each of the cylinders 54 of shift rods D, C, B and A are cross connected by passages 77, 78 and 79 so that pressure fluid will flow through the passages and out of the cylinder for shift rod A to line 80, if either of the piston grooves 58 or 59 are in alignment with the passages as disclosed. Pressure fluid from line 80 passes along lines 81 and 82 to the fluid motor 83 which maintains the valve 70 in its illustrated condition. In this position of the plunger of the valve 70, pressure fluid from conduit 69 passes to line 71 and through the solenoid valve 164 for selectively actuating the several clutches 24, 25 and 16 as desired in the normal operation of the machine. The valve 70 also controls the operation of a creep clutch 84, and in the illustrated position, the valve 70 connects the creep clutch 84 through lines 85, 67 and 68 to the reservoir 60. The annular grooves in the pistons 54 are in alignment with connecting passages 77, 78 and 79 when shifting of the gear clusters is completed. As shown, grooves 58 of pistons 54 for shift rods D, B and A are in alignment, the shift rods D, B and A being in normal position. Piston for shift rod C has been moved to shift its rod to the right, and in such position aligns its groove 59 with the aforesaid passages. Thus either grooves 58 or 59 of each piston are in alignment depending on whether its associated shift rod is in the left position or its right position. In the event that shift rod C, in its movement to the right position is stopped short of its full movement by the sides of the teeth of the gear being shifted abutting the sides of the teeth of the companion gear to be engaged, its groove 59 will not become aligned and the passage of fluid from line 76 to line 80 will be stopped by the center of the piston 54, that lies between grooves 58 and 59, blocking the flow of fluid from passage 77 to 78. This removes pressure from lines 80, 81 and 82 and from fluid motor 83. The plunger of valve 70 will therefore move to the right under the action of spring 70' and position its cross passages in active relation. The cross passages of valve 70 disconects pressure from line 69 to line 71 and connects line 71 to exhaust line 85 to thereby deactuate both clutches 24 and 25 to relieve the previously described braking action applied by their simultaneous actuation and permit operation of the spindle drive. At the same time, the other cross passage of the plunger in the valve 70 connects the creep clutch 84 to pressure line 69 to thereby activate the creep clutch. As a result of the deenergization of the solenoid G, the transmission drive clutch is deactuated and the main drive shaft 19 is disconnected from the pulley 4. Instead the spindle 3 is connected by the actuated creep clutch 84 to be driven at a creep speed, for instance at a 50 to 1 ratio, as illustrated in FIG. 2.

Pulley 4, driven by belt 6 and motor 5, FIG. 1, drives the input shaft 12 which has a large gear 86 formed integrally therewith meshing with a gear 87 that drives a sun gear of a planetary gearing 88, the planetary gearing being one example of a speed reducing gearing. The gear 87 and the driven part of the planetary gearing 88 are freely rotatable on a reduced diameter 89, of a shaft 91 which is mounted at each end in bearings 92 and 93 fixed in the frame. The drive part, or ring gear 88', of the planetary gearing is keyed at 94 to the shaft 91 as is the driven part of the creep clutch 84. The drive part of the clutch 84 drives a gear 95, which is freely rotatable on bearings 95' on the shaft 91. Gear 95 meshes with a gear 96 which has a tubular extension that is keyed at 96' to the tubular extension of the bevel gear 22 that drives bevel gear 23 and the first shaft 31 of the transmission.

From the foregoing it will be seen that if any of the gears get stuck during the shifting of one or more gear clusters, the corresponding pistons 54 will fail to complete their movement and block the flow of fluid from pressure line 76 to line 80 and thereby remove the pressure in fluid motor 83 of valve 70. Valve spring 70' thereupon shifts the plunger of valve 70 and, as a result, the two directional clutches 24 and 25 are deactivated to relieve the braking action and permit operation of the transmission. At the same time, the creep clutch 84 is activated to actuate the drive from pulley 4 through the slow speed planetary transmission 88 to bevel gears 22 and 23 for driving the transmission at creep speed. In actual practice, the substitution of the creep drive for the normal speed drive, to relieve the restriction to the shifting of a gear, is so instantaneously effective and thereby such a momentary operation that it is barely noticeable in the operation of the transmission. The reason for this is that the moment the stuck gear is released for proper meshing, the shift rod completes the meshing and, in doing so, completes its full stroke and aligns its groove 59 with the said cylinder passages and again permits fluid flow from pressure line 76 through the passages 77, 78, 79 and the aligned grooves 58 or 59 to lines 80, 81, and 82 and thence to the motor 83 for shifting valve 70. Shifting of valve 70 deactivates the creep clutch and its creep drive and again transmits fluid for selectively operating the clutches 16, 24 and 25 to obtain the desired operation of the spindle 3. The automatic operation of the creep clutch very effectively insures meshing of the gears by producing relative movement of the nonaligned stuck gears in such a flash action that hardly a noticeable pause to the drive is perceptible.

It is therefore an important feature of this invention to arrange the gear cluster ratios and their shifting in such a manner and so coordinated with the high and low range motor speeds that a geometric progression of speed can be had without overlap. This is illustrated in the chart shown in FIG. 8, wherein the first vertical column notes the geometric progression of speeds in spindle r.p.m. The second vertical column denotes whether shifter rod A and its gear cluster A-1 are actuated from their normal position or not. The third, fourth, and fifth vertical columns denote whether shifter rods B, C, and D and their associated gear clusters B-1, C-1 and D-1, respectively are moved from their normal positions or not. In the sixth and seventh columns of the chart, an X in a particular horizontal line denotes whether the drive motor is energized for operation at its 1200 r.p.m. speed or at its 1800 r.p.m. speed. The eighth vertical column denotes whether or not the solenoid associated with the valve 160 is energized or not and with these explanations, the remaining columns will be understood by the legends applied in the figure. It will be noticed that the shifting follows a pattern of a series of four speed groups wherein in each group one of the two input speeds are used and the input speed changes or alternates from group to group throughout the series. In speeds of 100 to 138 r.p.m., of the first group, the input speed is 1200 r.p.m., in the speeds of 153 to 210 r.p.m., forming the second group, the input speed of 1800 r.p.m. is used, and the alternation of the input speeds continues throughout the series. Also a pattern of actuation of the shifter rods A and C repeats in each group of four speeds. In obtaining the speed of 100 in the first speed of the first group, only rod C is shifted, in the second speed, no rods are shifted, in the third, shift rods A and C are shifted, and in the fourth speed 138 r.p.m., only rod A is shifted. This sequence of shifting rods A and C is the same in each of the eight illustrated groups. In the second group, the said sequence is modified by using the 1800 r.p.m. input speed, in the third group, the said sequence is modified by returning to the 1200 speed and actuating rod B and its cluster B-1 in combination with the actuation of the shifter rods A and C. After gear cluster B-1 is used for two groups, then gear cluster D-1 is used for two groups and finally for the last two groups, both gear clusters B-1 and D-1 are used. A further explanation of this will be given hereinafter.

Figure 7:
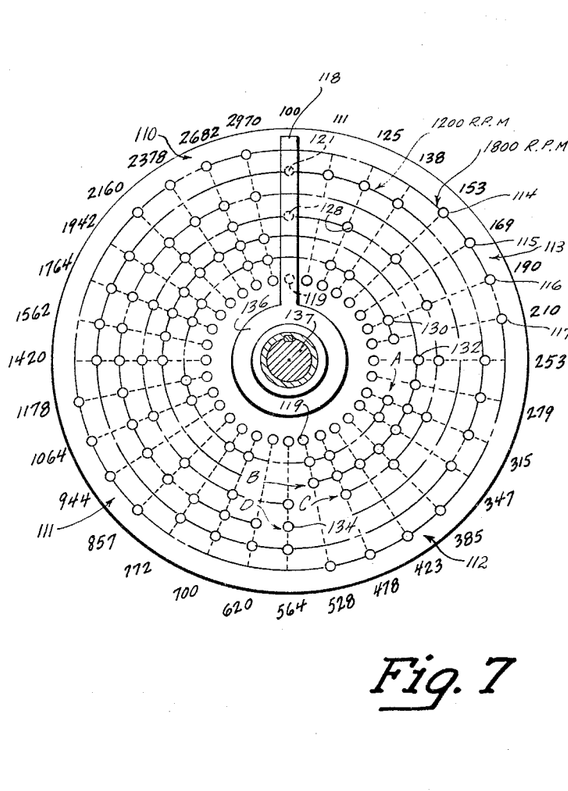
FIG. 7 is a section through the controller taken along the plane represented by the line 7—7 in FIG. 6.
Figure 10:
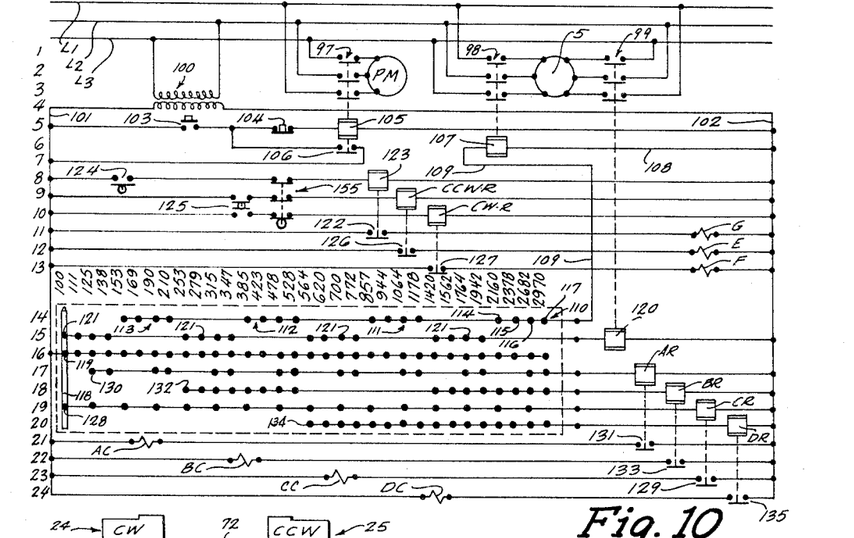
FIG. 10 is a diagrammatic showing of the electrical circuit for controlling the operation of the machine.

The illustrated manner in which the machine is operated and the controls are activated to select the desired speed among the geometric progression of speeds is shown in FIGS. 7, 9 and 10. FIG. 10 discloses the electrical diagram in which power for operating the machine is derived from a three phase source represented by the lines $L_1$, $L_2$ and $L_3$, which feed current to the normally open contacts 97 of the pump motor, PM, to the normally open 1800 r.p.m. contacts 98 of the transmission motor 5, to the normally open 1200 r.p.m. contact 99 of the transmission motor 5 and to a transformer 100 which supplies the control voltage across lines 101 and 102.

In line 5 of the diagram, current flows from line 101 to normally open contacts of starter switch 103, through the normally closed contacts of off switch 104, to starter relay 105 and from thence to line 102 to return to its source represented by the transformer 100. Actuation of this cross line by closing starter switch 103 will energize relay 105 to close the normally open contacts 97 of the pump motor PM, and actuate the pump motor. A holding circuit for maintaining the pump motor connected starts in line 7, from power line 101, through contacts 106, closed by relay 105, to the cross line 5 of the diagram and to the right, as already noted, to power line 102. This circuit by-passes starter switch 103 and can be broken by actuation of the off switch 104. In line 6 of the diagram, the starter relay 107 for the 1800 r.p.m. speed of the transmission motor is disclosed connected, on one hand, to power line 102 by conductor 108, and on the other hand, to power line 101 by conductor 109 which extends down to line 14 and along said line 14 towards but not to power line 101. Line 14 shows the conductor 109 interconnecting four spaced groups, 110, 111, 112 and 113, of contacts, with four contacts, 114, 115, 116 and 117, to a group. This is representative of the alternative use of the 1800 r.p.m. speed in alternate groups of four speeds. A wiper 118, of a controller, to be later described, moves along the panel indicated by the dotted lines, in step by step fashion. The wiper 118 is always connected to power line 101 by the engagement of the series of contacts 119 at each step of movement. The contacts 119 are connected to each other and to power line 101 as indicated in line 16 of the diagram. It will be noted that upon the fifth step of movement of the wiper 118 it will engage the first contact of group 113 and thereby complete the circuit to relay 107 (line 6) to start the transmission motor running at 1800 r.p.m.

The normally open contacts 99 (lines 1, 2, 3) to run the transmission motor at its 1200 r.p.m. speed are closed in a similar manner by relay 120 (line 15) which is connected from power line 101 to connected contacts 119, to the wiper 118, to any one of the contacts 121 (line 15), through relay 120 and thence to power line 102. The contacts 121 (line 15) are interconnected to each other and form groups of four contacts each which alternate with the groups 110, 111, 112 and 113 of the 1800 r.p.m. speed control. Wiper 118 is shown at the start of an operation connecting power line contacts with the first contact 121 of the group of contacts controlling the 1200 r.p.m. speed of the transmission motor and this is in accordance with the 100 r.p.m. speed line of the chart of FIG. 8. As the wiper moves to the right it will move past power contacts of the 1200 r.p.m. speed to the four contacts of the 1800 r.p.m. speed and so alternate to the end of its travel. In this way, alternate motor speeds in groups of four speeds each are furnished.

Solenoid G for operating the solenoid valve 164 is shown in line 11 as being controlled by normally open contacts 122 which are closed by a relay 123, line 8, when actuated by an on-off switch 124.

Lines 9 and 10 of the diagram provide power for relays CW-R and CCW-R under control of a selector directional switch 125 to determine the clockwise or the counterclockwise rotation of the spindle. Relay CCW-R operates normally open contact 126, line 12, to activate solenoid E of the valve 72, FIG. 9, to admit hydraulic pressure to the counterclockwise clutch 25. Similarly, relay CW-R actuates normally open conduit 127, line 13, to actuate solenoid F of valve 72 to admit hydraulic pressure to the clockwise clutch 24. The directional switch 125 determines whether the one or the other solenoid is actuated, but prevents the actuation of both at the same time. A switch 155 having three contacts in lines 8, 9 and 10 respectively, may be actuated for simultaneously breaking the circuits to the relays 123, CCW-R and CW-R to thereby deenergize the solenoids G, E and F prior to a speed change operation for reasons previously described.

Figure 8:
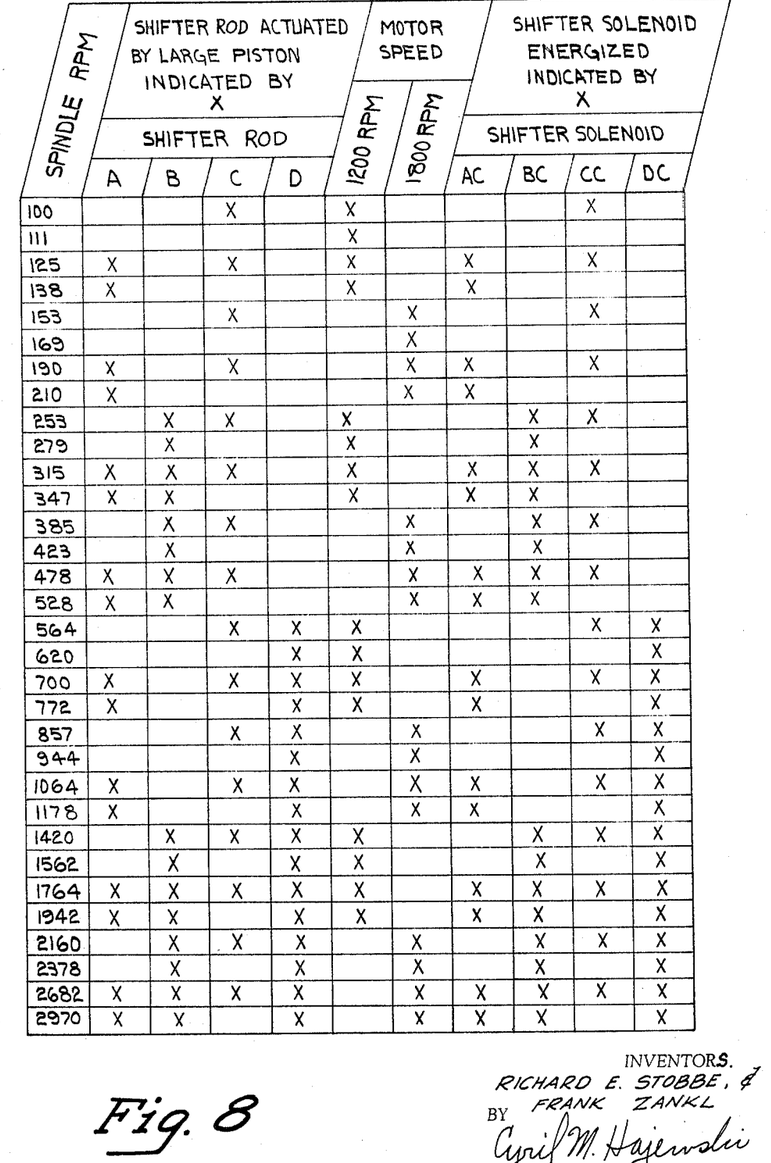
FIG. 8 is a chart showing the actuation of the shifter rods in relation to the operation of the two input speeds to produce the specified spindle speeds.

Returning to the panel of contacts and the wiper 118, the speeds produced by the stepwise movement of the wiper 118 are indicated in the space between lines 13 and 14 of the diagram. The wiper, in the position illustrated in FIG. 10, is at the 100 r.p.m. speed which, as indicated in the chart of FIG. 8, requires the use of the 1200 r.p.m. speed and the actuation of shifter rod C to shift gear cluster C-1. In this position of wiper 118, the speed of 1200 r.p.m. has been selected by bridging contacts 121 and 119 as already explained. The wiper also engages contact 128, line 19, to conduct current along line 19 of the diagram to connect relay CR between power lines 101 and 102. Energized relay CR closes normally open contact 129, line 23, to energize the solenoid valve 162 to produce actuation of the shift rod C to the right, as shown in FIG. 9. Thus in this position of wiper 118, the speed of 1200 r.p.m. is used and cluster C-1 is shifted to obtain the spindle speed of 100 r.p.m. In the next stepwise position of wiper 118, the input speed of 1200 r.p.m. is retained but no other electrical connections are completed. As a result, the four shifter rods remain in the normal position and in accordance with the chart of FIG. 8, this gives the spindle speed of 111 r.p.m.

The next position of the wiper retains the motor speed of 1200 r.p.m. and engages the second contact 128 for shifting gear cluster C–1 as already explained. In addition of this, contact 130, line 17, is also engaged which carries current from power line 101 to relay AR and thence to power line 102, for energizing relay AR which closes contact 131, line 21, to energize the solenoid coil AC for the solenoid valve 160 to shift gear cluster A–1 which, in accordance with the chart of FIG. 8, gives the speed of 125 r.p.m. Similarly the wiper moves step by step to the right to engage contacts in accordance with the chart of FIG. 8, to obtain the speeds noted. When the speed 253 r.p.m. is arrived at by movement of the wiper 118, another contact 132, line 18, is also engaged which conducts current from power line 101 to relay BR and thence to power line 102 to close contact 133, line 22, to energize the solenoid BC of the valve 161 to move shifter rod B to the right and thereby shift cluster B–1. Similarly at the speed 564 r.p.m., wiper 118 engages contact 134, line 20, to energize relay DR to close contact 135, line 24, to energize the solenoid DC of the valve 163 to actuate shift rod D to the right and shift gear cluster D–1. The step by step movement of the wiper 118 to the right will engage successive contacts in each step to operate the electrical elements for producing the speeds shown respectively in FIG. 8.

Figure 6:
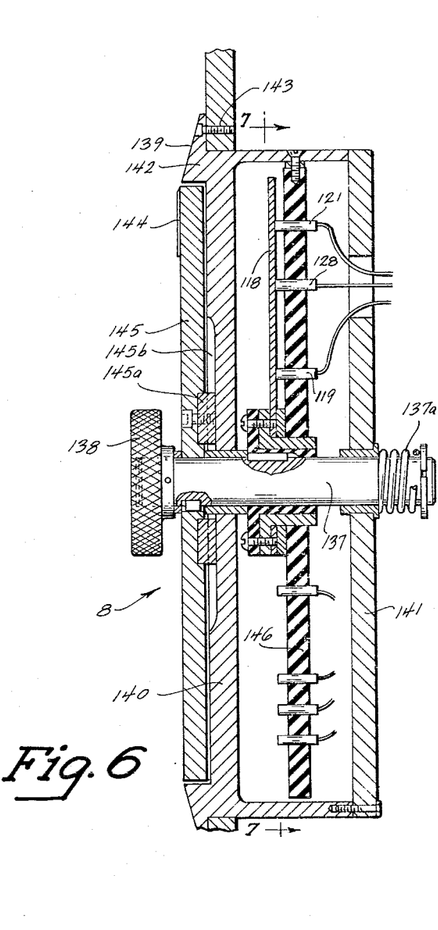
FIG. 6 is a sectional view taken along the plane represented by the line 6—6 in FIG. 1 to illustrate the controller for regulating the operation of the transmission.

The array of contacts in the dotted panel of FIG. 10 are shown along straight lines in conjunction with straight line travel of wiper 118 for clarity. This showing is for convenience of illustration, but in actual construction, the contacts are arranged in a circle and the wiper moves around a pivot at one end. This is illustrated in FIGS. 6 and 7. As there shown, the wiper 118 has a hub 136 rotating on and keyed to a shaft 137. At its outer end, the shaft 137 is provided with a knob 138, FIGS. 1 and 6, to rotate an attached pointer to indicate the desired speed. The speeds are arranged in a circle on the dial 8, FIG. 1, and indicated at 139 and correspond to the speeds noted in FIG. 7. FIG. 6 illustrates the construction of the controller as constituting a shallow circular box 140 having a back plate 141 closing the back thereof, and a front flange 142 securing the box to the front of the machine by bolts 143. Around the front of this flange are the speed indicia 139. Through the center of the box is a rotatable shaft 137 which mounts the pointer 144, a disc 145, the knob 138, and the wiper 118. A circular plate 146 is secured to the box and this plate carries the contacts 121, 128, etc., that are illustrated in FIGS. 7 and 10. Control wiring extends from each contact through the back 141 of the box.

The contacts in FIG. 7 are in the same order as the contacts in FIG. 10 but arranged in circles rather than straight lines. The outer circle of contacts 114, 115, 116, 117, etc., control the 1800 r.p.m. speed, the next, or second circle of contacts 121 control the 1200 r.p.m. the third circle of contacts control the operation of relay DR, the fourth circle of contacts control the operation of the relay CR, the fifth circle of contacts control the operation of the relay BR, the sixth circle of contacts control the operation of the relay AR, and seventh or inner circle for the common contact 119 to the power line 101.

The controller can be operated by turning the knob 138 to set the pointer at the desired speed and the wiper 118 will rotate with it to engage the appropriate combination of contacts for obtaining the selected spindle speed. In this position, the wiper will connect the proper contacts to power line 101 to energize those solenoids which produce the desired speed. As illustrated in FIG. 7, the pointer is set at the 100 r.p.m. speed and the wiper 118 engages contacts 121 and 128 to activate the 1200 r.p.m. speed and energize solenoid CC for shifting gear cluster C–1 which, in accordance with the chart in FIG. 8, produces 100 r.p.m. The wiper's relation to the other speeds will be apparent from the above explanation.

The casing 140 has slots 145b for each angular position of the wiper on a radial line through each speed and the pointer 145 has corresponding projections 145a to enter the slots and thereby lock the wiper at the selected speed. The shaft 137 is axially slidable and is held in its inner position by spring 137a. To select a speed, knob 138 is pulled outwardly to move the projections outwardly of the slots and thus unlock the shaft for rotation to the selected speed. When the shaft 137 is moved outwardly, the attached wiper 118 is also moved outwardly and away from contact engagement with the series of contacts on plate 146. This prevents actuation of the control circuits during speed selection since the wiper is out of contact until the speed is selected and the shaft 137 returned under the pressure of spring 137a.

In the instant case, the transmission was illustrated as one example of the invention in starting the range of speeds at 100 r.p.m. and ending at 2970 r.p.m. with thirty-two speeds in all, but it is apparent that other speed ranges and number of speeds in the range can be used in accordance with the principles of this invention. Also, the instant disclosure of four speeds to an alternation of the input drive can be changed to a greater or lesser number of speeds per alternation, depending on the range and number of speeds in the range.

It will be recognized that other numbers of speed per group and other arrangements of shifting the gear clusters, or other ratio change means, as well as other input speeds can be utilized. However, and regardless of the selection, the progression ratio corresponding to the selected starting and ending speed of the range, as well as to the number of speeds in the range, has to be found. Having found the progression ratio and selected the two input speeds for alternation, the frequency of the alternation of the two input speeds must be determined and the gears are selected that will produce a gear train to give the spindle speeds that are in accordance with the successive powers of the ratio.

A geometrical progression of speeds is a series of speeds in which each speed is derived by multiplying the preceding speed by a constant multiplier called the "ratio." Thus, 2, 6, 18, 54 and 162 is an increasing geometrical progression with a ratio of 3. Accordingly, in a geometrical progression of spindle speeds each speed is equal to the preceding speed multiplied by the ratio. Or, it may also be stated that a range of spindle speeds in geometrical progression begins with the low speed and progresses by increasing the first speed by successive powers of the ratio.

The low speed of the range is given and is not affected by the ratio. However, the second speed is the first speed multiplied by the ratio, while the third speed is the first speed multiplied by the square of the ratio. Since the ratio is not utilized for calculating the first speed, the highest speed will be calculated by multipling the first speed times the ratio carried to a power which is one less than the number of speeds in the entire range. Assuming, for example, that the spindle speed range includes thirty-two separate speeds ranging from 100 r.p.m. to 3000 r.p.m., the first speed will be 100. The second speed will be 100 multiplied by the first power of the ratio, while the third speed is 100 multiplied by the square of the ratio, and so on, until the last speed will be 100 multiplied by the thirty-first power of the ratio or approximately 3000 r.p.m., which is the desired highest rate of spindle rotation. Once the geometrical progression of spindle speeds is calculated in this manner, the gear ratios to accommodate the available motor speeds may be figured to yield the desired spindle speeds of the geometrical progression.

As previously mentioned, when using a variable speed fixed step transmission in conjunction with a low speed range and a high speed range of operation, it has been the accepted practice to obtain a geometrical progression of speeds by shifting the transmission through its range of steps successively while the low speed range is engaged and then repeating the same successive steps of the transmission for cooperation with the high speed range of operation. This arrangement results in a serious disadvantage in that it produces an overlap of speeds in the high and low ranges so that some of the speeds produced by the transmission when the low range is engaged are repeated when the transmission steps are reengaged successively in the high speed range of operation. A characteristic of known fixed step transmissions having two ranges of operation, is that they all have a predetermined number of steps for varying the output of the transmission, such as sixteen fixed steps. When these sixteen fixed steps are utilized in the low range of operation they produce sixteen different speeds. Then when these same sixteen fixed steps are repeated in the high range of operation, another sixteen output speeds are produced. However, the first eight speeds produced in the high range of operation will be found to be duplicates of the last eight speeds obtained in the low range of operation. Accordingly the prior known transmissions produce a lesser number of useful driving speeds than is produced with the transmission of the present invention. In the particular transmission referred to having a transmission of sixteen fixed steps, the theoretical number of different speeds is thirty-two. However, such transmissions will only have a twenty-four useful driving speeds because of duplication of speeds obtained at the high end of the low range of operation and the low end of the high range of operation.

The present invention avoids these disadvantages by intermixing the alternation of the high speed and low speed ranges with the shifting of the transmission through its fixed steps. Such deviation from past practice enables the design of a variable speed, fixed step transmission operating with a high speed range and a low range speed wherein the speeds in the low range of operation do not overlap with the speeds in the high range although all steps of the transmission are utilized in both ranges.

In the illustrated embodiment, the variable speed transmission is provided with sixteen steps and it is driven by the motor 5 which can be operated at either 1200 r.p.m. or 1800 r.p.m. As clearly shown in the chart of FIG. 8, the speed range for rotation of the spindle 3 is 100 r.p.m. to 2970 r.p.m. divided into thirty-two speeds that increase from the lowest speed to the highest speed in a geometrical progression in which the progression ratio is 1.116. Each of the sixteen steps of the variable speed transmission is driven by the motor 5 operating at 1200 r.p.m. and again at 1800 r.p.m. to yield the thirty-two different speeds of rotation of the spindle 3.

In the present embodiment it has been found that the thirty-two different speeds can be obtained by shifting the transmission through four successive steps while it is being driven by the motor operating at 1200 r.p.m. and then repeating the four steps of the transmission while the latter is being driven by the motor operating at 1800 r.p.m. to yield a total of eight different spindle speeds that advance in a geometrical progression. The motor is then returned to the 1200 r.p.m. operation while the transmission is shifted through its four succeeding steps and these four steps are repeated with the motor running at 1800 r.p.m. to obtain the next eight spindle speeds of the geometric progression. Thus, the motor is operated at the same speed while the transmission is operated through four of its steps to obtain four spindle speeds. The motor is then operated at its alternate speed while the transmission is operated through the same four steps to obtain the next four spindle speeds. This procedure is then continued until the thirty-two different spindle speeds are obtained by virtue of the two speed motor operating in cooperation with the sixteen step variable speed transmission.

As shown in the chart FIG. 8, the first speed of 100 r.p.m. is obtained by operating the motor 5 at 1200 r.p.m. and directing hydraulic pressure to the large piston 55 for actuating the shifter rod C, and the other shifter rods remain in their normal positions as established by the hydraulic pressure applied to their right ends. The second speed of 111 r.p.m. is obtained by continuing operation of the motor 5 at 1200 r.p.m. and interrupting all pressure to the large pistons 55 so that all four shifter rods remain in their normal positions. The next spindle speed of 125 r.p.m. is obtained by the combined actuation of shifter rods A and C with the motor running at 1200 r.p.m., and the fourth spindle speed of 138 r.p.m. is achieved by actuating only the shifter rod A with the motor continuing to run at 1200 r.p.m. The succeeding four speeds of 153 r.p.m., 169 r.p.m., 190 r.p.m. and 210 r.p.m. are obtained by running the motor 5 at 1800 r.p.m. and actuating the shifter rods in the same sequence as described above for the first four speeds.

Each successive spindle speed is equal to the preceding speed multiplied by the ratio with slight variations to accommodate for gear design inasmuch as gears must include a full number of teeth. Thus, the third speed of 125 r.p.m. is equal to 100 multiplied by $1.116^2$ and the fourth speed of 138 r.p.m. is 100 multiplied by $1.116^3$.

The fifth speed of 153 r.p.m. which starts the second group of four speeds is equal to the immediate preceding speed multiplied by the ratio. The first four speeds, 100 to 138, represent a progression of powers of the ratio from 0 power to the third power, and in order to continue this progression, the second group of four speeds will follow with the motor running at 1800 r.p.m. by repeating the actuation of the shifter rods A and C to shift their associated gear clusters A-1 and C-1 respectively in the same manner and sequence as was accomplished in the first group of four speeds with the motor running at 1200 r.p.m. Accordingly, the first four transmission steps that were utilized to obtain the first group of four spindle speeds with the motor running at 1200 r.p.m. are repeated with the motor running at 1800 r.p.m. to obtain the second group of four speeds. In this manner, the first eight speeds of the geometric progression are produced.

For the purpose of this description, the thirty-two spindle speeds are divided into eight groups with four successive speeds in each group. Alternate groups are obtained by operating the motor 5 at 1200 r.p.m. while the other groups are produced with the motor running at 1800 r.p.m. It will be noted from the chart in FIG. 8 that the shifting of the transmission follows a definite pattern. As described above, the pattern of the transmission steps is the same for the second group of spindle speeds as it is for the first group of spindle speeds with the rotation of the motor 5 being increased from 1200 r.p.m to 1800 r.p.m. for the second group of speeds. As shown in FIG. 8, the pattern of actuation of shifter rods A and C that occurred for the first group of spindle speeds is repeated in the third and fourth groups, but in addition, the shifter rod B is actuated by the large piston 55 to shift the gear cluster B-1. This same pattern of actuation of shifter rods A and C that occurred in the first group of spindle speeds is also repeated in the fifth and sixth groups, but for these two groups the shifter rod D is also actuated for shifting the gear cluster D-1. In the seventh and eighth groups, the pattern of actuation of the shifter rods A and C provided for the first group is again repeated but in addition both shifter rods B and D are actuated to shift their associated gear clusters B-1 and D-1 respectively.

As a result of this definite pattern of conditions for obtaining the desired progression of speeds the transmission lends itself particularly well to automatic control, especially for control from recorded data. The definite pattern of gear shifting through the geometric progression of speeds in conjunction with the alternation of the low and high ranges, as previously discussed in connection with FIG. 8, enables the binary numbering system to be employed for identifying the different spindle speeds with each condition that affects the output speed of the transmission representing one of the digits of the binary number. This feature is clearly shown in the chart illustrated in FIG. 11.

Figure 11:
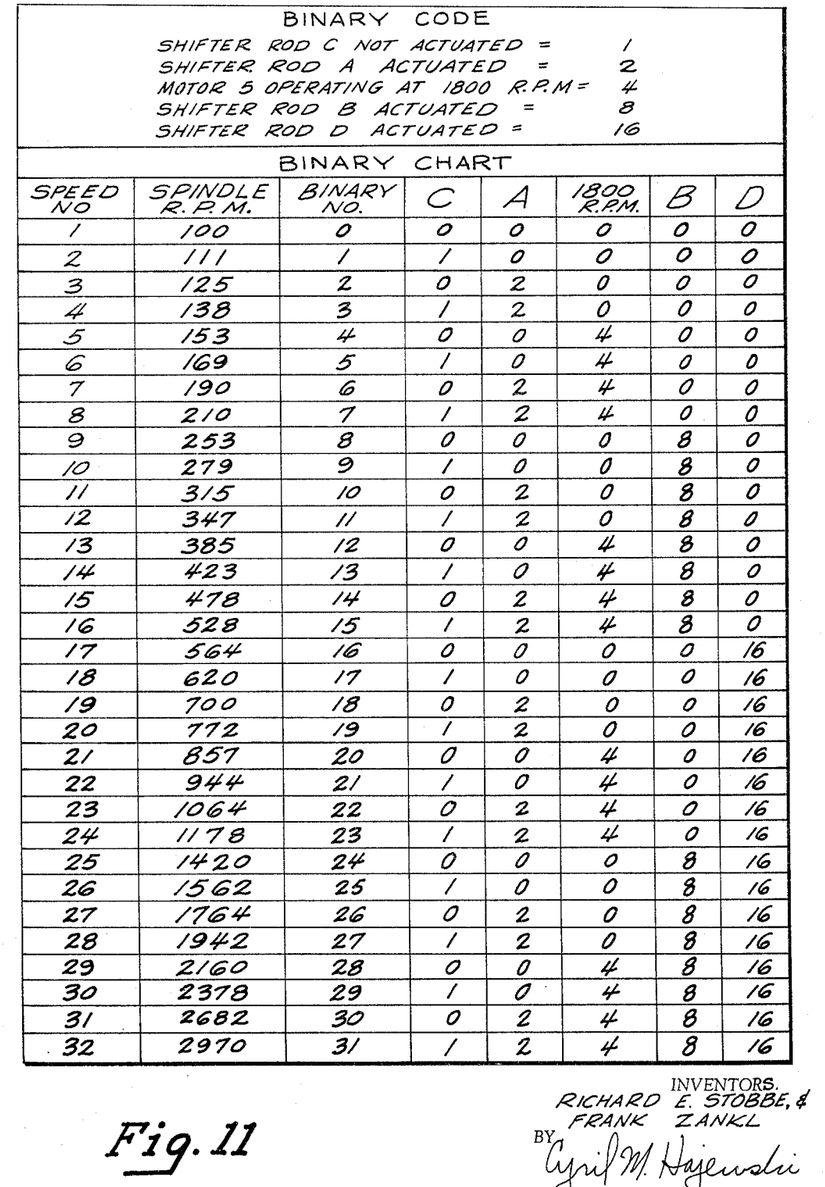
FIG. 11 is a chart illustrating the adaption of the speed selection system of the present invention for identifying the shifting and speed range conditions in accordance with the binary numbering system.

Since thirty-two spindle speeds are provided, the binary number contains five digits and the first speed is identified by the binary number 0 so that thirty-two speeds can be identified. The binary number for each speed is shown in the third column of the chart but the number is conveniently indicated in decimal form. The fourth through the eighth columns in the chart represent the five digits of the binary number. The values of each of these digits when the digit is "on" are indicated in the appropriate boxes by a decimal number for the sake of clarity. The legend at the top of the chart indicates how the various values of the five binary digits are arrived at. It will be noted that as these values are applied to each condition that affects the output speed of the transmission they yield the binary number that identifies the particular speed that is produced by the existing condition.

For example, the binary number 12 identifies the spindle speed of 385 r.p.m. From the chart in FIG. 8 it is apparent that in order to obtain this speed, the transmission is driven by the high motor speed of 1800 r.p.m. and the shifter rod B is actuated. In the chart of FIG. 11, it is indicated that the 1800 r.p.m. motor speed represents the third digit of the binary number, while the actuation of the shifter rod B represents the fourth digit of the binary number. In view of the fact that these conditions exist, the third and fourth digits of the binary number are "on." Since the third digit of a binary number has a value of 4 and the fourth digit has a value of 8, the binary number 12 is represented and it identifies the spindle speed of 385 r.p.m., as indicated in the chart. This same binary number identification may be made for the other thirty-one speeds. Accordingly, each digit has only two conditions, it is either "off" or it is "on" for a particular spindle speed and this greatly facilitates the design of an electrical control system for automatically operating the transmission and especially for its automatic operation in response to information contained on a record, such as a punched tape.

The proper alternation of the high and low ranges to obtain the desired results may be readily calculated. In the exemplary embodiment, it was determined that the spindle is to be rotated at thirty-two different speeds from 100 r.p.m. to approximately 3000 r.p.m. Thirty-two separate speeds, of course, can be obtained from a sixteen speed transmission operating with a two speed motor if each step of the transmission is driven by both motor speeds without overlapping the spindle speeds.

If $X$=the low speed of 100 and $R$=the progression ratio, it is apparent from the above discussion that $XR^{31}$=3000. Since $X$=100

$$R^{31} = \frac{3000}{100} = 30$$

Therefore $$R = \sqrt[31]{30} = 1.116$$

This calculation for R is well known practice. From a practical standpoint, the number of motor speeds available is extremely limited. A commercially available motor operable selectively at 1200 r.p.m. and 1800 r.p.m. was chosen for the exemplary embodiment as being especially well adapted to meet the described circumstances. Different speed motors may be more desirable to accommodate other situations. However, as previously mentioned, in order to avoid the overlap of speeds, the present invention provides for alternating the low and high ranges in the progression and it must be determined how frequently the alternation should occur. Assuming that an alternation will occur every fifth speed, it will be apparent from the chart in FIG. 8 that $XR(1800) = XR^5(1200)$. With $X$=100, the value of R is calculated as 1.106681. This value most nearly approximates the previous value of 1.116 that was calculated for R from the equation $XR^{31}$=3000. If the value for R were calculated for an alternation of the high and low ranges at every third speed, the equation would be $XR(1800) = XR^3(1200)$. This would yield a value for R that is too remote from the previously calculated value of 1.116 and therefore, an alternation of the high and low ranges at every third speed is not appropriate to meet the exemplified situation. The slight discrepancies in the values for the ratio can be easily accommodated in the design of the transmission. For example, it will be noted from the chart in FIG. 8 that although the calculations were based on a top speed of 3000 r.p.m., the top speed that was actually obtained is 2970 r.p.m. For practical purposes, this speed is close enough to the desired speed to yield the required results. As a matter of fact, as previously mentioned, deviations from a precise geometrical progression of spindle speeds are made in normal practice to facilitate the design of the gears that are employed in the transmission.

From the foregoing detailed description of the illustrative embodiment set forth herein to exemplify the present invention, it will be apparent that there has been provided an improved transmission arrangement employing a fixed step variable speed transmission in conjunction with a low speed range of operation and a high speed range of operation in which all of the available steps in the transmission are utilized with both ranges of operation without an overlap of speeds in the low and high ranges to produce the maximum number of speeds by intermixing the alternation of the low and high ranges with the shifting of the transmission through its successive steps in a pattern that will operate to the best advantage for the particular circumstances and which is especially well adapted to be operated automatically by an electrical control system.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms without departing from the spirit and scope of the invention as defined in the subjoined claims.

The principles of this invention having now been fully explained in connection with the foregoing description, we hereby claim as our invention:

1. In a multi-speed drive;
   a train of gearing including a plurality of shiftable gear clusters;
   shift means for each of said gear clusters for shifting said gear clusters singularly or in combination to vary the ratios in said gearing to provide a desired output;
   an input drive including a normal speed and a creep speed takeoff;
   means to connect said normal speed takeoff to said train of gearing;
   detecting means individual to each of said shift means to detect the failure of any of said shift means to complete a shifting operation due to the lack of gear meshing in shifting;
   means coordinating said detecting means and operable upon any incomplete shifting for disconnecting said normal speed takeoff and connecting said creep speed takeoff to said train of gearing to condition said stuck gears for meshing, and upon meshing thereby complete shifting automatically disconnecting said creep speed takeoff and connecting said normal speed takeoff.

2. The invention set forth in claim 1;
wherein each of said shift means includes a fluid motor having a cylinder and shifting piston;
a source of fluid pressure;
control means individual to each cylinder for admitting fluid pressure thereto to actuate said pistons as desired;
and wherein said detecting and coordinating means includes a fluid operated control;
a separate line from said source of fluid pressure associated with each of said fluid motors for directing fluid pressure to said fluid operated control;
means individual to each of said fluid motors for allowing a flow of fluid pressure along said separate line to said fluid operated control when the pistons are in either of their operating positions but, when any of said pistons fail to create a complete shift stroke, to block the passage of fluid along said separate line;
means associated with said fluid operated control when under fluid pressure to connect said normal speed takeoff and disconnect said creep speed takeoff but when not under fluid pressure to disconnect said normal speed takeoff and connect said creep speed takeoff.

3. The invention as set forth in claim 2;
wherein said association of said separate line with said fluid motors comprises a side passage into one of said cylinders connected to said fluid line;
another side passage out of said one cylinder and connected into another cylinder;
a side passage out of said another cylinder and similarly arranged with the remaining cylinders and out of the last cylinder so that fluid pressure in said separate line can pass into and out of the several cylinders and to said fluid operated control, the pistons of each cylinder having two passages, one located with respect to the side passages of its cylinder to allow flow of fluid when piston is not under pressure and the other so located to allow passage of fluid when the piston has made a complete shift stroke, and when the pistons are not in either of said two positions to block passage of fluid along said separate line.

4. The invention as set forth in claim 3;
wherein said connections to normal and creep speeds are fluid operated clutches, and said fluid operated control constitutes a valve having passages to connect said creep clutch to exhaust and said normal speed clutch to fluid pressure when said fluid operated valve is under pressure, and having passages to connect said normal speed clutch to exhaust and said creep speed clutch to pressure when said fluid operated valve is not under pressure.

5. The invention as set forth in claim 1;
wherein said input drive has branch drives;
first control means connecting one of said drives to said transmission for operation at normal speed;
a subsidiary transmission adapted to be driven by the other branch drive for operation at creep speed;
second control means connecting said subsidiary transmission for driving said main transmission at creep speed and disconnecting said normal speed drive and said coordinating means deactivating said first control and actuating said second control when said detecting means detects a control out of operating position.

6. A transmission having an input drive;
a train of gearing including shiftable gear clusters;
a shift means individual to each gear cluster to shift the same;
means associated with each of said shift means to denote an incomplete shifting; and
means coordinated with said associated means and operable in response to said associated means noting an incomplete shift to modify said input drive so that said train of gearing is driven at a considerably different speed.

7. A transmission adapted to selectively provide a succession of speeds arranged in geometric progression including a two speed drive;
a train of gearing including a plurality of shiftable gear clusters and control means for alternately connecting said two speed drive to said train of gearing throughout said geometric progression of speeds, each connection covering a group of speeds and for shifting said gear clusters in proper relation to each speed of said progression; and, means activated when the shifting of any of said gear clusters fails to complete a shift operation to run the drive through a speed reduction means and thence to said train of gearing until the gear shift operation is completed.

8. The invention as set forth in claim 7;
wherein said speed reduction means produces a creep speed.

9. A transmission adapted to selectively provide a succession of speeds arranged in geometric progression including;
a two speed drive;
a train of gearing including a plurality of shiftable gear clusters and control means for selecting a desired speed, said control means when moved successively from the first to the last speed of said progression including means for alternately connecting said two speed drive to said train of gearing, starting at the lower of said two speeds with each connection covering a group of speeds each of the same number of speeds;
means shifting certain of said gear clusters in the same order in each group to effect a basic order of sequence for each group which, as modified with the first speed, produces the first succession of speeds of the geometric progression forming the first group and as modified with the alternate speed of the second group producing the next speeds of the progression;
means shifting another of said gear clusters for the next two groups which, together with the shifting of said certain gear clusters and said alternate speeds produces the next succession of speeds of the progression;
means shifting another of said gear clusters for the next two groups which, together with the said shifting of said certain gear cluster and the alternation of said two speeds produces the next succession of speeds of the progression; and
means for shifting both of said other gear clusters which, together with the said shifting of said certain gear clusters and said alternate speeds produces the next succession of speeds of said progression.

10. A transmission including a normal drive;
an abnormal drive for providing a materially different drive speed;
a train of gearing having a plurality of shiftable gear clusters;
means selectively connecting said normal drive to said train of gearing; and
means responsive to an incomplete shifting of any of said gear clusters for substituting said abnormal drive until the shifting operation is completed.

11. In a transmission including a plurality of gear clusters;
a plurality of companion gears;
means to shift the gear clusters for meshing with different companion gears;
input means for driving the transmission;
detecting means determined by the shifting operation to detect any gears that have not meshed or become stuck;

means controlled by the detecting means to create a materially different drive speed to the transmission to unstick the gears; and said last mentioned means including means to discontinue the different drive speed when the stuck gears become properly meshed and allow the transmission to be driven at its regular speed.

12. A transmission constructed to selectively furnish successive speeds forming a geometric progression;
a train of gearing including a plurality of ratio change units;
a two speed input drive;
a controller which may be indexed successively past the progression of speeds including means alternately connecting the two speeds of said input drive to said transmission to divide said progression into groups, each group having a series of speeds;
means actuating certain of said ratio change units at each speed of the first group to set a pattern of said geometric progression, each speed differing by the same progression ratio and repeating said actuation for each subsequent group, said second speed of said drive being such as to increase the pattern to form the next series of speeds of said progression;
means actuating other of said ratio change units for each subsequent two groups to deviate said pattern which, with each two alternations of the two speed drive will continue the successive speeds in geometric progression; and
means to operate said controller to select the speed desired.

13. In a multi-speed drive for producing a series of speeds in a progression;
a fixed step variable speed transmission;
a low speed range operable with said transmission for producing a plurality of speeds corresponding in number to the number of steps in said transmission; and
a high speed range operable with said transmission for producing a plurality of speeds corresponding in number to the number of steps in said transmission with each of the speeds produced in said high speed range of operation differing from any of the speeds produced in said low speed range of operation,
whereby the multi-speed drive includes the progression of speeds equal in number to twice the number of steps in said fixed step transmission without a duplication of any of the speeds in the progression.

14. In a transmission;
a two speed drive motor;
a train of gearing including a plurality of ratio change units for individually varying the output speed of the transmission;
actuating means to operate said change units individually and in combination; and,
a controller selectively indexable past a succession of speeds arranged in geometric progression, said controller including means operable to effect the alternate connection of said two speeds of said drive motor to drive said train of gearing, each motor speed being adapted to drive said train of gearing with an identical series of ratio variations to produce a group of successive speeds of the progression, said controller also being operable at selected speeds to effect the operation of said change unit actuating means to effect the actuation of an additional change unit to modify the previous series of ratio variations which in conjunction with the alternate connection of the two speeds of said drive motor will produce an additional group of continuing successive speeds in the progression.

15. In a multi-speed drive;
a train of gearing including a plurality of speed change units to selectively vary the output speeds of the multi-speed drive;
a two speed input drive operable to drive said train of gearing at a selected one of its two operating speeds;
a speed selecting controller indexable to a succession of speed selecting positions of a group of speeds of a geometric progression of speeds, said controller including means operable to initiate the actuation of certain of said speed change units in each of a plurality of groups, said controller also including means operable to initiate the actuation of other of said speed change units for subsequent groups in cooperation with the varying of said certain speed change units to thereby produce still other groups of a series of speeds, said controller including means to effect the operation of said speed input drive to alternate the two speeds thereof with each group of speeds so that the speeds of each group as established through said speed change units are altered group by group to produce a geometric progression of different output speeds equal in number to twice the number of speed change units varied and each speed of the progression being different than any other speed produced.

16. In a transmission adapted to furnish successive speeds arranged in a geometric progression;
a train of gearing including a plurality of ratio change units;
a two speed input drive for driving said train of gearing at a selected one of the two inputs;
a controller having means to effect the alternate operation of said two speed input drive wherein one speed of the input will cover a series of speeds in the geometric progression and the other speed of the input will cover another series of speeds in the geometric progression;
a first means operable in response to the said controller to activate certain of said ratio change units in a particular order which in cooperation with the first speed of said input drive will produce the first series of speeds in the geometric progression and in cooperation with the second speed of said input drive will produce the next series of speeds to continue the geometric progression;
second means operable in response to said controller to activate another ratio change unit together with the particular order of activation of said certain ratio change units which in cooperation with the two speeds of said input drive will produce a third and fourth series of speeds in the geometric progression;
third means operable in response to said controller to activate still another ratio change unit together with the particular order of activation of said certain ratio change units which in cooperation with the two speeds of said input drive will produce a fifth and sixth series of speeds in the geometric progression; and,
fourth means operable in response to said controller to activate both of said other ratio change units together with the particular order of activation of said certain ratio change units which in cooperating with the two speeds of said input drive will produce a seventh and eighth series of speeds in the geometric progression,
whereby the number of output speeds of the transmission will be equal in number to twice the number of activated ratio change units without a duplication in any of the speeds produced.

17. A change speed transmission comprising a train of gearing including axially shiftable gears engageable selectively in different combinations for varying the output speed of the transmission with the gears being shiftable in a succession for producing progressively increasing output speeds; a low speed drive connected to said gears selectively for driving each of said gear combinations in a low speed range; a high speed drive connected to said gears selectively for driving each of said gear combinations in a high speed range; a speed selector operable for selecting the desired output speed of the transmission; a shifter responsive to said speed selector for shifting said gears into the different combinations for producing the output speeds designated by said selector; and, a controller responsive to said selector for selectively actuating said low range drive and said high range drive to drive the selected gear combinations in either the high range or the low range for producing the speed designated by said selector, said controller being arranged to actuate said low and high range drives alternately with the shifting of said gears during said succession of gear combinations with the alternation of said low and high range drives being intermixed with the shifting of said gears that produces said succession of gear combinations to produce different output speeds in geometric progression equal in number to twice the number of available gear combinations, with each of said output speeds being different than any of the other output speeds.

18. The transmission according to claim 17, wherein there is provided a motor having two operating speeds selectively connectible to drive the transmission for providing the low range drive for driving each of said gear combinations in the low speed range, and for providing the high range drive for driving each of said gear combinations in the high speed range.

19. The transmission according to claim 17, wherein said shifter and said controller cooperate to produce the operation of a group of gear ratios with the low range drive and to cause the operation of the identical group of gear ratios in the same sequence with the high range drive to produce a series of transmission output speeds in a substantial geometric progression.

20. The transmission according to claim 17, wherein said shifter for shifting the shiftable gears in different combinations comprises, means shifting certain of said gears in an established order to produce a sequence of different gear ratios which, as driven by the first motor speed, produces a first series of successive speeds of the geometric progression forming the first group of output speeds of the progression and as driven by the alternate motor speed producing a second series of successive speeds forming a second group of output speeds of the progression; means shifting another of said gears which in cooperation with the shifting of said certain gears in the established order produce another sequence of different gear ratios which when driven in succession by said first motor speed will produce a third series of successive speeds forming a third group of output speeds of the progression and when said sequence of different gear ratios are driven in the same sequence by said second motor speed produce a fourth series of successive speeds forming still another group of output speeds of the progression with the four successive series of output speeds forming the desired geometric progression.

References Cited by the Examiner

UNITED STATES PATENTS

| | | | |
|---|---|---|---|
| 2,010,556 | 8/1935 | Nenninger et al. | 74—346 X |
| 2,167,790 | 8/1939 | Whitehead et al. | 74—346 X |
| 2,177,011 | 10/1939 | Whitehead et al. | 74—346 X |
| 2,501,286 | 3/1950 | Mirossay | 74—346 X |
| 2,781,879 | 2/1957 | Ebersold | 74—364 X |
| 2,992,565 | 7/1961 | Hansen et al. | 74—346 |

DAVID I. WILLIAMOWSKY, *Primary Examiner.*

L. H. GERIN, *Assistant Examiner.*